United States Patent [19]

Man et al.

[11] Patent Number: 5,920,340
[45] Date of Patent: Jul. 6, 1999

[54] METHOD AND APPARATUS FOR SELF-TESTING OF A MULTIMEDIA SUBSYSTEM

[75] Inventors: Albert Man, Markham; Gerald L. Ogaki, Scarborough, both of Canada

[73] Assignee: ATI International, SRL, Barbados, Virgin Islands (Br.)

[21] Appl. No.: 08/900,818

[22] Filed: Jul. 25, 1997

[51] Int. Cl.[6] ............................................. H04N 17/04
[52] U.S. Cl. ............................................. 348/181; 348/189
[58] Field of Search ............................. 348/180, 181, 348/182, 184, 189, 177, 552, 553, 725

[56] References Cited

U.S. PATENT DOCUMENTS

| | | | |
|---|---|---|---|
| 5,313,280 | 5/1994 | Straus | 348/189 |
| 5,343,242 | 8/1994 | Rowsell et al. | 348/181 |
| 5,499,050 | 3/1996 | Baldes et al. | 348/180 |
| 5,537,145 | 7/1996 | Miseli | 348/181 |
| 5,602,586 | 2/1997 | Schauer et al. | 348/189 |
| 5,764,284 | 6/1998 | Stoker | 348/181 |

*Primary Examiner*—Victor R. Kostak
*Attorney, Agent, or Firm*—Markison & Reckamp

[57] ABSTRACT

A method and apparatus for self-testing of a multimedia subsystem is accomplished by retrieving a pattern from a first section of memory, where the retrieving is done by a video graphics circuit. Having retrieved the pattern, the video graphics circuit provides it to a video capture circuit via a television encoder. Upon receiving the pattern, the video capture board generates a capture pattern therefrom. The capture pattern is then provided by the video capture circuit to memory via the video graphics circuit. Once the video capture pattern is stored in memory, the capture pattern is compared with the original pattern. When the comparison is favorable, the video capture circuit, the television tuner, and the interconnecting paths have passed testing.

25 Claims, 6 Drawing Sheets

METHOD AND APPARATUS FOR SELF-TESTING OF A MULTIMEDIA SUBSYSTEM

TECHNICAL FIELD OF THE INVENTION

This invention relates generally to multimedia systems and more particularly to a method and apparatus for self-testing of a multimedia subsystem.

BACKGROUND OF THE INVENTION

A computer, which has multimedia features, includes a multimedia subsystem, a central processing unit, Input/Output circuits that allow the computer to receive and transmit data with other computers and computer peripherals, such as a computer monitor. The multimedia subsystem includes a video graphics circuit, an audio processing circuit, a television tuner, a television encoder, and a video capture circuit. The video graphics circuit, based on data received from the central processing unit, provides pixel information, in a red, green and blue ("RGB") format, to the computer monitor, which may be a CRT, and to the television encoder. The television encoder converts the RGB output into a composite TV signal (E.g. NTSG, PAL, SECAM) data which can be then displayed on a television set. In addition, the pixel information may be provided to an RGB capture circuit, which allows the computer to store video data in the digital domain.

The basic architecture of the multimedia subsystem has been in existence since the 1980's and has been modified only slightly since. The modifications include adding a common bus that couples the video graphics card, a video capture circuit, the television encoder, the television tuner, and the audio processing circuit together. Thus, the circuits of the newer multimedia subsystem architectures provide for greater data capabilities and to operate at much higher data rates than their predecessors.

To test the video output of a multimedia subsystem, a sensor is placed over the CRT, which is coupled to the video graphics circuit output, to determine the visual aspects of video data being displayed. The sensor monitors the video aspects of the CRT and, using an ICC profile table, determines the color spectrum of the images being displayed. While this technique works well to verify the functionality of the video graphics circuit, the cost of such sensors is in the range of $500.00 to $700.00, per sensor, which is cost prohibitive to include the sensor in consumer market personal computers that roughly costs in the range of $1,500.00 to $3,500.00.

To test the video capture circuit, and the TV encoder, the video capture circuit is provided with an input test pattern and the television encoder output is monitored using a vector scope. In essence, a human monitors the output on the vector scope to determine whether the video capture circuit and the television encoder are functioning properly.

To test the television tuner, it receives a video input from a video generator and converts the video input into a base video signal. (Note that a good quality video generator costs $3,000 to $5,000.) The base video signal is subsequently provided to the video capture circuit which converts the base signal into a digital signal that is subsequently provided to the television encoder. The television encoder converts the signal to produces a YUV output that is tested by human interaction using a vector scope. If the vector scope yields a pattern which conforms to an anticipated pattern, the television tuner, the video capture circuit, and the television encoder are determined to be functional. While this technique works well to verify the functionality of these circuits, a vector scope costs in excess of $10,000.00.

Therefore, a need exists for a method and apparatus for testing a multimedia subsystem that is not cost prohibitive for the consumer market.

DETAILED DESCRIPTION OF THE DRAWINGS

Generally, the present invention provides a method and apparatus for self-testing of a multimedia subsystem. This may be accomplished by retrieving a pattern from a first section of memory, where the retrieving is done by a video graphics circuit. Having retrieved the pattern, the video graphics circuit provides it to a video capture circuit via a television encoder. Upon receiving the pattern, the video capture board generates a capture pattern therefrom. The capture pattern is then provided by the video capture circuit to memory via the video graphics circuit. Once the video capture pattern is stored in memory, the capture pattern is compared with the original pattern. When the comparison is favorable, the video capture circuit and the interconnecting paths have passed testing. With such a method and apparatus, a multimedia subsystem is self-tested without the need for expensive sensors and/or vector scopes. As such, the self-testing multimedia system is much more applicable to commercial settings.

Figure 1:
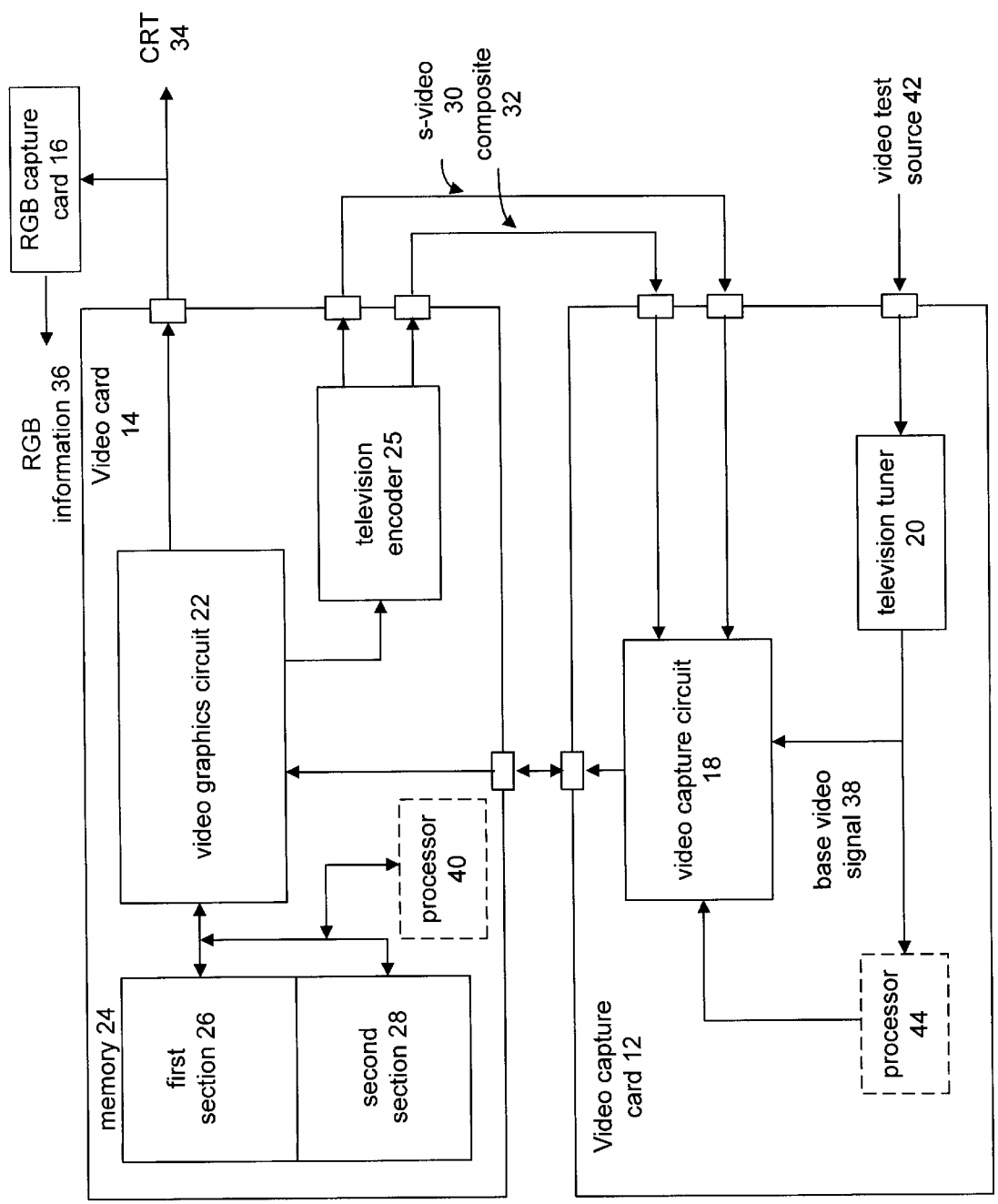
FIG. 1 illustrates a schematic block diagram of a multimedia subsystem which is in accordance with the present invention.

The present invention can be more fully described with reference with FIGS. 1 through 6. FIG. 1 illustrates a schematic block diagram of a multimedia subsystem 10, configured in a self test mode, that includes a video capture card 12, a video card 14, and an RGB capture card 16. The video capture card 12 includes a video capture circuit 18, a television tuner 20, and may further include a processor 44. The video card 14 includes a video graphics circuit 22, memory 24, which includes a first section 26 and a second section 28, a television encoder 25, and a processor 40. The normal operation of the video capture card 12 is to provide video data either to a video graphics subsystem, such as a CRT 34, or to a television monitor (not shown). Note that the multimedia subsystem may contain three separate boards, as shown, may be a single board, or any combination thereof. Further note that the multimedia subsystem may not include a RGB capture card 16.

In normal operation, the S video output 30 of the video card 1 is coupled to a television monitor. Similarly, the composite video output 32 of the video card 14 is coupled to a television monitor, or similar displaying device. The S video input of the video capture circuit and/or the video composite input of the video capture card 12 are operably coupled to receive video signals from video sources such as a cable television set top box, a satellite television set top box, a video cassette recorder, a DVD player, Laser Disc Player, etc. The television tuner 20 receives, via its input, television broadcasts.

In the self-test mode, the S video output 30 and the composite video output 32 of the video card 14 are coupled to the S video input and composite video input of the video capture card. In this configuration, the video graphics circuit 22 retrieves a pattern from the first section of memory 26 and provides it to the video capture circuit 18 via the television encoder 25. Upon receiving this pattern, the video capture circuit 18 generates a capture pattern as it would with any other video data it receives. The capture pattern is then provided to the video graphics circuit 22 and subsequently stored in the second section 28 of memory 24. With the capture pattern and the original pattern stored in memory, a comparison between them is performed. If the comparison is favorable, i.e., few errors or differences between the two patterns is detected, the video capture circuit, the television encoder, and the interconnections between the circuits are determined to have passed testing.

Conversely, when the capture pattern does not compare favorably to the original pattern, at least one of the television encoder, the interconnecting paths, or the video capture circuit 18 has failed testing. Note that the video graphics circuit 22 and/or the processor 40 may perform the comparison process and may further perform at least a portion of the processes illustrated in FIGS. 2 through 6. Further note that the processor 40 may be a separate device such as a micro-processor, micro-controller, digital signal processor, or any other device which manipulates digital information based on programming instructions. Alternatively, the processor 40 may be part of a central processing unit of a computer, or a portion of the video graphics circuit 22.

To test the television tuner and the video capture circuit 18, a video test source 42 is provided to the television tuner 20. The television tuner 20 converts the video test source, which may be a plurality of video test patterns, into a base video signal 38 as it would upon receiving an input from any source. The base video signal 38 is provided to the video capture circuit 18 which converts the signal to a digital representation. The digital representation is then stored in memory 24. Having stored the digital representation, the processor 44, the processor 40, and/or the video graphics circuits 22, converts the digital representation into a simulated test pattern display. Such a simulated test pattern display is the mathematical equivalent of a vector scope display. The simulated test pattern display is then compared with a representation of the video test source, which is the anticipated vector scope display. When the comparison is favorable, the television tuner has passed testing. Such a favorable comparison is generally indicated when a ninety-nine and one-half percent (99.5%) success rate has been obtained. In other words, an error rate of one-half percent (0.5%) or less would be considered passing. Further note that the error rate may change depending on the visual quality of the particular displaying device.

In the self-test mode, the multimedia subsystem further tests for high/low impedance shorts across video signals, open and/or high impedances between such video signals, bad color, and/or intensity conversions from a digital to analog converter of the television encoder and/or video graphics circuit 22. The multimedia subsystem self test further tests for excessive noise within the system, low quality video output to the CRT, wherein such quality can be determined in the range of two by two pixels, and for bad connections within the particular cards 12 and 14 and/or the connections to and from cards 12 and 14.

As mentioned, the video test source 42 may be a plurality of test patterns. One such test pattern is a color test screen which has the entire screen consisting of three separate test screens each separate test screen is at one hundred percent (100%) color saturated and at one hundred percent (100%) intensity of red, green or blue. Using this test pattern, the correct chrominance is verified, the level of interference is determined based on unwanted colors, and excessively dim luminance is determined.

Another video test pattern is a color bar test screen. In this particular test pattern, a color bar test checks the hue and color saturation accuracy. Color saturation and luminance are typically set for one-hundred percent (100%) during this test. In this test, the color bar test also checks for interference which shows up as unwanted colors in a particular test bar, or plurality of test bars, and excessively dim luminance.

Still another video test pattern includes a modulated staircase test screen. In this particular video test pattern, the luminance levels are stepped at different levels, such as five steps, wherein the luminance ranges from as little as ten percent (10%) to ninety percent (90%). This video test pattern verifies video quality corresponding to the various luminance levels. With the plurality of video test patterns, the multimedia subsystem 10 is self tested in a variety of ways to ensure accurate performance. In addition, other aspects of the multimedia subsystem may be tested such as the television encoder, and the video capture circuit utilizing the video card in conjunction with the video capture card 12. Such testing may be done without the need for additional expensive equipment such as sensors and vector scopes.

Figure 2:
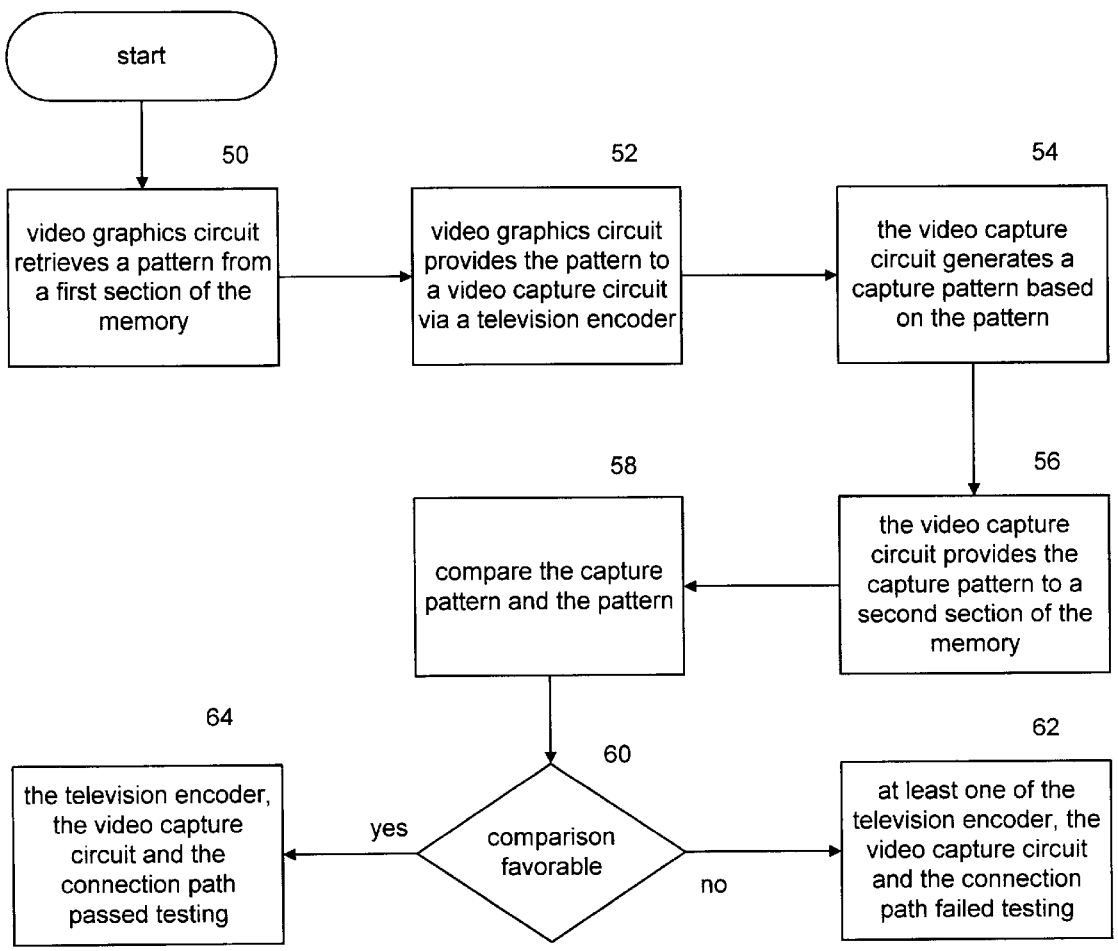
FIG. 2 illustrates a logic diagram which may be used for self-testing a multimedia subsystem in accordance with the present invention.

FIG. 2 illustrates a logic diagram which provides a process for self-testing a multimedia system. The process functions are implemented as programming instructions are executed by the video graphics circuit 22, the processor 40, the processor 44, the video capture circuit 18 and/or any combination thereof. The process begins at step 50 where the video graphics circuit retrieves a pattern from a first section of memory. Such a pattern includes any one of the plurality of video patterns, which have been previously discussed. Having retrieved the pattern, the process proceeds to step 52 where the video graphics circuit provides the pattern to a video capture circuit via a television encoder. Such coupling is illustrated in FIG. 1.

Having provided the pattern to the video capture circuit, the process proceeds to step 54 where the video capture circuit generates a capture pattern based on the pattern.

Having done this, the process proceeds to step 56 where the video capture circuit provides the capture pattern to a second section of the memory. The process then proceeds to step 58 where a comparison is made between the capture pattern and the pattern stored in the first section. The process then proceeds to step 60 where a determination is made as to whether the comparison was favorable. If the comparison was not favorable, the process proceeds to step 62 where at least one of the television encoder, the video capture circuit and the interconnections between such circuits have failed testing. If, however, the comparison was favorable, the process proceeds to step 64 where the television encoder, the video capture circuit and the interconnecting paths have passed testing.

Figure 3:
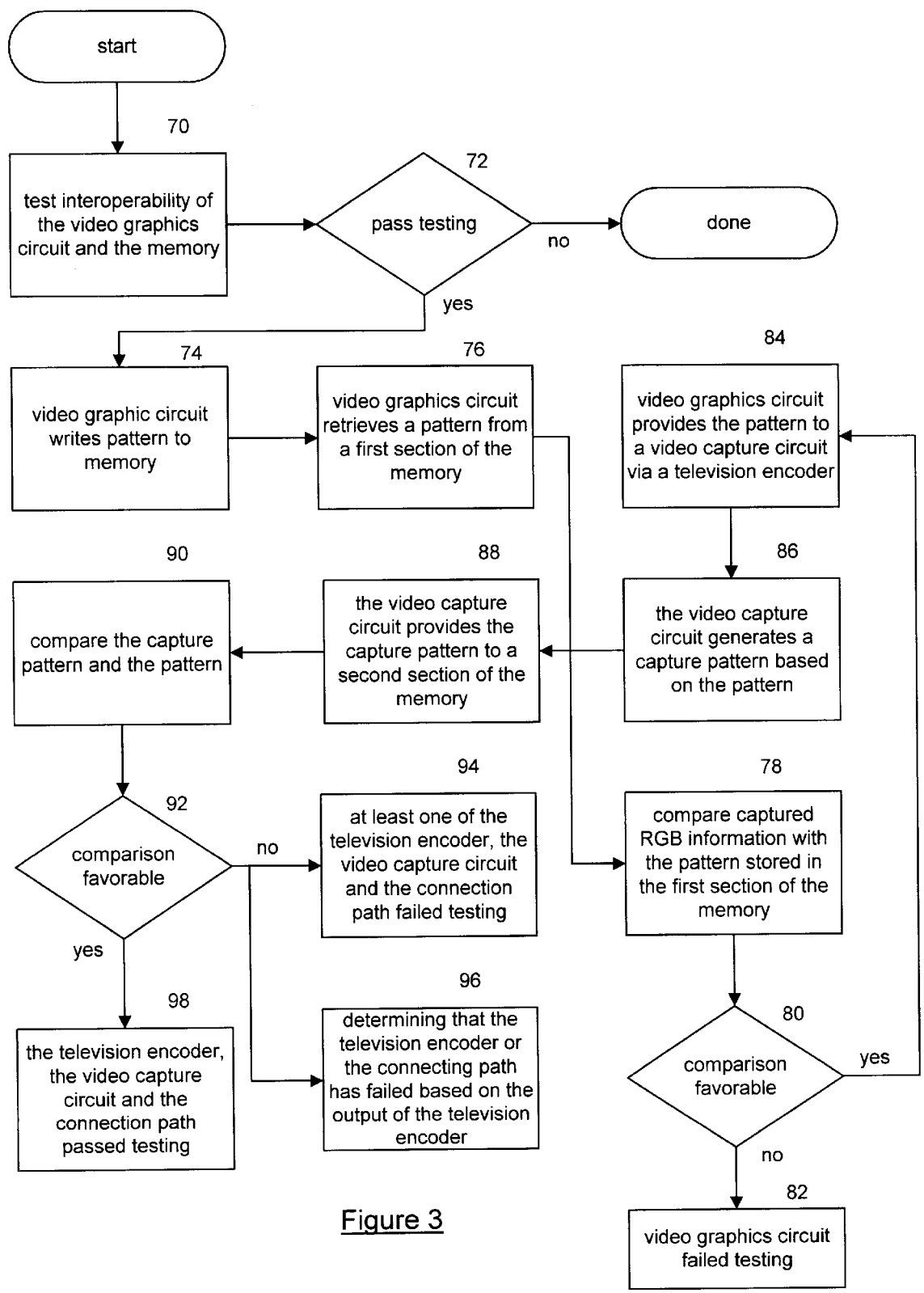
FIG. 3 illustrates a logic diagram that may be used to test a multimedia subsystem in accordance with the present invention.

FIG. 3 illustrates another logic diagram for self-testing a multimedia subsystem. The process begins at step 70 where the inner-operability of the video graphics circuit and memory is tested. Such testing involves writing information from the video graphics circuit to the memory and then reading the information. If the reading and writing is accurate, the test was successful. This is depicted at step 72. If the video graphics circuit and memory do not pass inner-operable testing, the process is done. When this occurs, the video graphics circuit and/or memory have failed testing. As such, the video card 12 needs to be replaced for subsequent testing of the video capture card 12.

If, however, the video graphics circuit and memory pass the inner-operability testing, the process proceeds to step 74. At step 74, the video graphics circuit writes a pattern into memory. The process then proceeds to step 76 where the video graphic circuit retrieves the pattern from a first section of the memory. Having done this, the process proceeds to step 78 where a comparison is made between captured RGB information and the pattern stored in the first memory. Such RGB information may be obtained from the RGB capture circuit. The comparison is performed by at least one of, but not limited to, a calculation of a simulated vector scope pattern or a visual analysis using a vector scope.

The process continues at step 80 where a determination is made as to whether the comparison was favorable. If the comparison was not favorable, the process proceeds to step 82 where the video graphics circuit has failed testing. If, however, the comparison was favorable, the process continues at step 84. At step 84, the video graphic circuit provides the circuit to a video capture circuit via a television encoder. The process then proceeds to step 86 where the video capture circuit generates a capture pattern based on the pattern. Having done this, the process proceeds to step 88 where the video capture circuit provides the capture pattern to a second section of the memory. The process then proceeds to step 90 where a comparison is made between the capture pattern and the pattern. In step 92 a determination is made as to whether the comparison was favorable. If so, the process proceeds to step 98 where the television encoder, the video capture circuit and the connections between such circuits have passed testing.

If, however, the comparison was unfavorable, the process proceeds to step 94 or 96. At step 94, at least one of the television encoder, the video capture circuit, and the inter-connecting paths between them have failed testing. At step 96, which is an alternative step to step 94, or in conjunction with step 94, provides a test, which is based on a visual output of the television encoder, to determine whether the television encoder or the interconnecting paths have failed. If the television encoder is outputting the appropriate s video information or composite video information, a determination can be made to indicate that the inner-connecting paths are the cause for the failure and not the television encoder.

Figure 4:
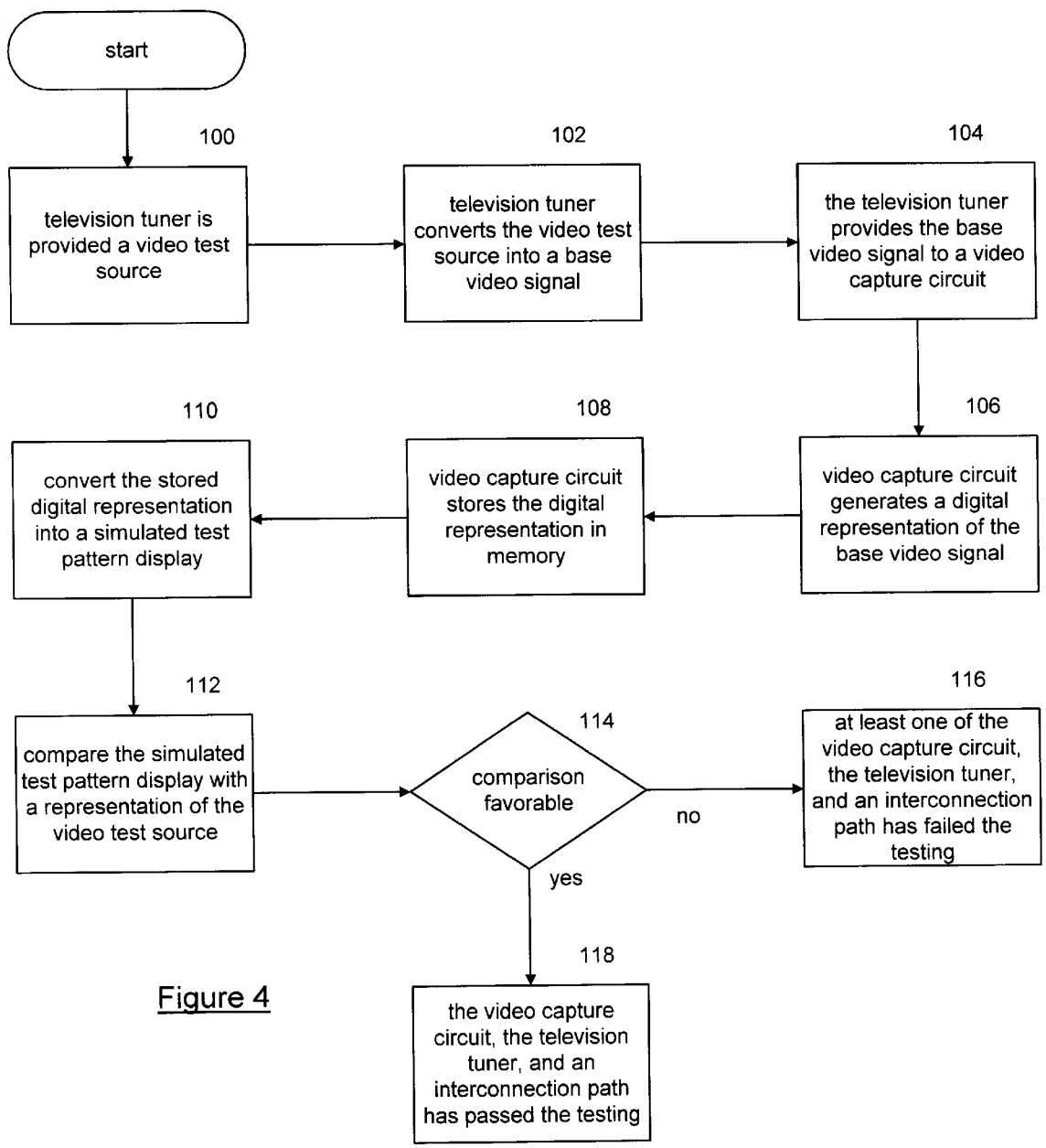
FIG. 4 illustrates another logic diagram that may be used to test a multimedia subsystem in accordance with the present invention.

FIG. 4 illustrates another logic diagram for multimedia subsystem self-testing. The process begins at step 100 where a television tuner is provided with a video test source. Such a video test source may be a plurality of test patterns such as color test screens, color bar test screens and/or modulated stair case test screens. The process then proceeds to step 102 where the television tuner converts the video test source into a base video signal. Such a conversion is well understood in the art so no further discussion will be presented except to illustrate the aspects of the present invention.

The process continues at step 104 where the television tuner provides the base ban video signal to a video capture circuit. Upon receipt of the base video signal, the video capture circuit generates a digital representation thereof The process then proceeds to step 108 where the video capture circuit stores the digital representation in memory. The process then continues at step 110 where the stored digital representation is converted into a simulated test pattern. At this point, the process proceeds to step 112 where the simulated test patterns are compared with a representation of the video test source. Such a comparison may be done by providing on the CRT, or television monitor, a vector scope simulated test pattern. Such a simulated test pattern display is shown in Video Demystified by Keith Jack, published by Harris Semiconductor on Pages A-1 through A-12. Such information is incorporated herein as part of this patent application.

The process proceeds to step 114 where a determination is made as to whether the comparison at step 112 was favorable. If not, the process proceeds to step 116 where at least one of the video capture circuit, the television tuner, and the inner-connecting paths have failed the testing. If, however, the comparison was favorable, the process proceeds to step 118 where the video capture circuit, the television tuner, and the inner-connecting paths have passed testing.

Figure 5:
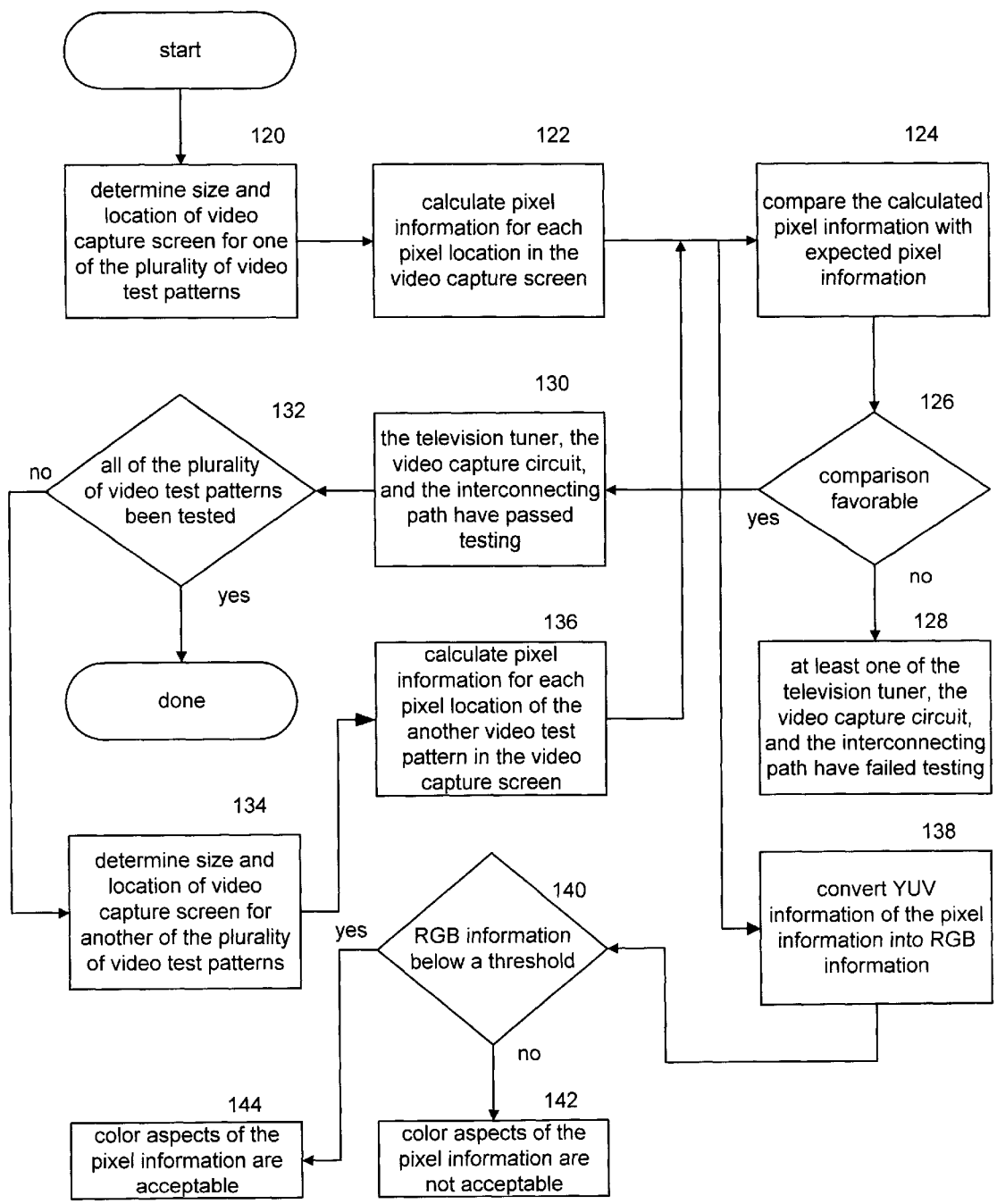
FIG. 5 illustrates yet another logic diagram which may be used to test a multimedia subsystem in accordance with the present invention.

FIG. 5 illustrates a logic diagram for calculating the simulating test pattern displays. The process begins at step 120 where a determination is made as to the size and location of the video capture screen for one of the plurality of video patterns. For example, the area of the video capture screen may be 320×235 pixels. A television image would be slightly smaller than this size because it is framed by a black border. The area of interest may be the full TV image, in the case of a solid color being displayed, or a portion of a TV image, such as a color bar. Since transition between colors contain noise above the limits set to check a specific color, captured colored areas are cropped, by N pixels, before they are analyzed. Each pixel in a select area is converted by YUV to RGB format and counted for its presence, and meeting expected color and intensity (which intensity value plus tolerance, and also for unwanted colors above the noise floor).

The process proceeds to step 122 where pixel information is calculated for each pixel location in the video capture screen. Such pixel information may contain luminance information, chrominance information and phase angle values of each pixel. The process then proceeds in parallel to steps 124 and 138. At step 124, the calculated pixel information is compared with expected information. The process then proceeds to step 126 where a determination is made as to whether the comparison was favorable. If not, the process proceeds to step 128 where at least one of the television tuner, the video capture circuit, and the inner-connecting path has failed testing. If, however, the comparison was favorable, the process proceeds to step 130. At step 130, the video tuner, the video capture circuit, and the inner-connecting paths have passed testing.

At step 138, the pixel information is converted from YUV information into RGB information. The process then proceeds to step 140 where a determination is made as to whether the RGB information is below a particular threshold. Such a particular threshold may be set such that the expected color and intensity are ninety-eight percent (98%) of the expected particular value. In addition, the threshold may include the fact that unwanted colors, above the noise floor are below the expected maximum bad color count.

If the RGB information is below the threshold, the process proceeds to step 144 where color aspects of the pixel information are acceptable. If, however, the RGB information is not below the threshold, the process proceeds to step 142 where the color aspects of the pixel information are not acceptable. Continuing with the process, after pixel information for a particular pixel location has been tested, the process proceeds to step 132, where a determination is made as to whether all of the plurality of the video test patterns have been tested. If so, the process is complete. If not, the process proceeds to step 134 where a determination is made as to the size and location of the video capture screen for another of the plurality of video test patterns. Having done this, the process proceeds to step 136 where the pixel information is calculated for each pixel location of another video test pattern within the video capture screen. Having done this, the process repeats at step 124 and 138, respectively.

Figure 6:
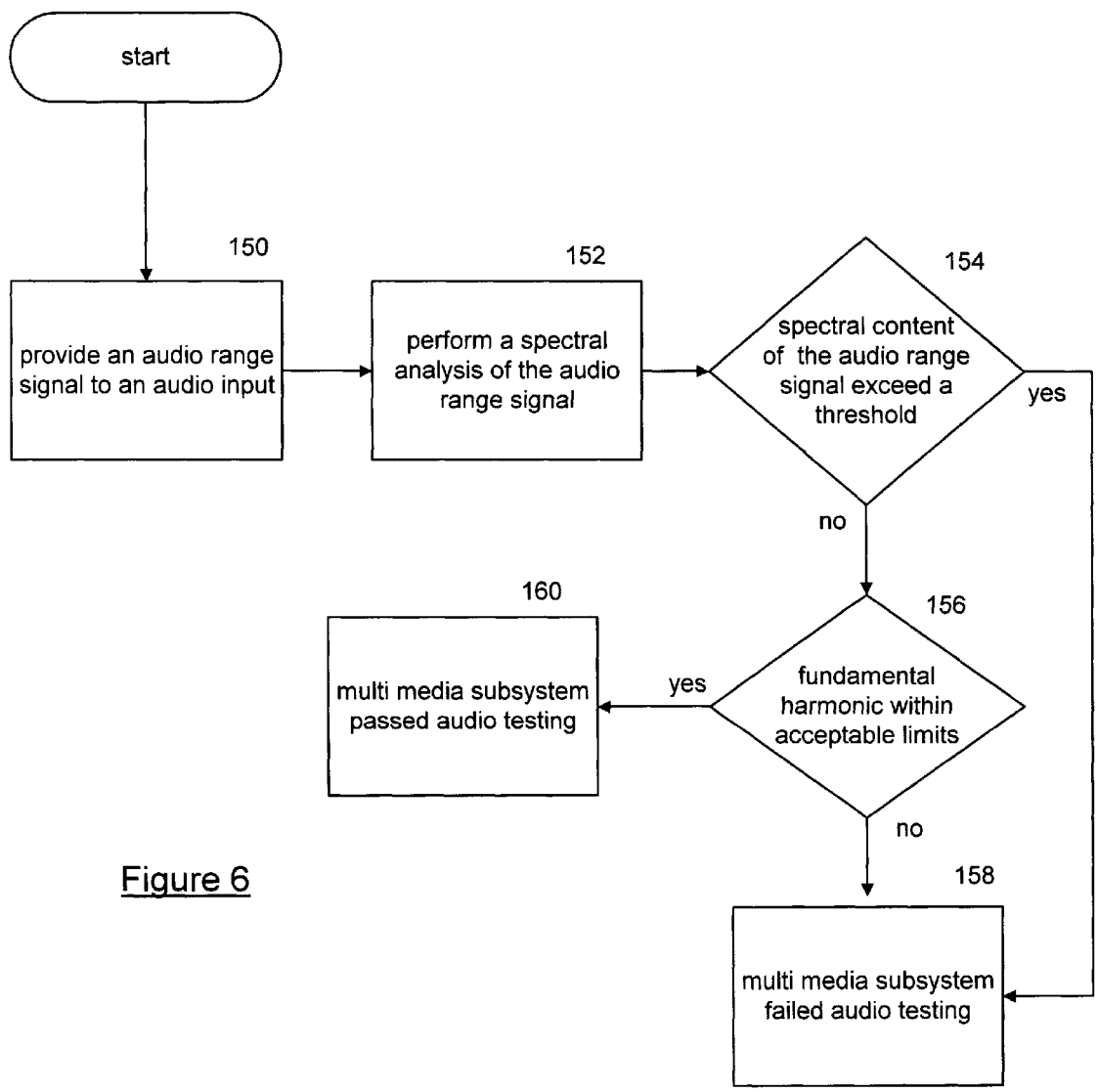
FIG. 6 illustrates a logic diagram which may be used to test the audio portion of a multimedia subsystem in accordance with the present invention.

FIG. 6 illustrates a logic diagram for testing audio performance of a multimedia subsystem. The process begins at step 150 where an audio-range signal is provided to an audio input. The audio range signal may be a sinusoid having a one kilohertz frequency, or any other signal within the audio range. The audio input may be a separate audio input of the multimedia subsystem, or one of the video inputs such as the television encoder, or the composite input to the video capture code 12.

The process then continues at step 152 where a spectral analysis, using a fast Fourier Transform (FFT), is performed on the audio-range signal. The process then proceeds to step 154 where a determination is made as to whether the spectral content of the audio range signal exceeds its threshold. Such spectral content looks at the energy levels of the harmonics of the audio-range signal. For example, by looking at the third harmonic of the audio-range signal, if it is below a particular threshold, for example, less than twenty-five percent (25%) of the magnitude of the fundamental harmonic, the spectral content is below the threshold. If, the spectral content is not below the threshold, the process proceeds to step 158, where the multimedia subsystem has failed audio testing.

If, however, the special content of the audio-range signal does not exceed the threshold, the process proceeds to step 156 where a determination is made as to whether the fundamental harmonics of the audio-range signal are within acceptable limits, which include magnitude and frequency content. If not, the process proceeds to step 158. If, however, the fundamental harmonics are within acceptable limits, the process proceeds to step 160 where the multimedia subsystem has passed audio testing.

The preceding discussion has presented a method and apparatus for a self-testing multimedia subsystem. Such a self-testing multimedia subsystem may be incorporated in a computer system and/or any video processing system. By utilizing the teachings of the present invention, a commercially acceptable testing mechanism for the multimedia subsystem is obtained without the costly requirements of sensors and vector scopes.

What is claimed is:

1. A method for testing a multi media subsystem, wherein the multi media subsystem includes a video capture circuit, a video graphics circuit, and a television encoder, the method comprising the steps of:

a) retrieving, by the video graphics circuit, a pattern from a first section of memory, wherein the pattern includes a digital representation of a predetermined type;

b) providing an encoded representation of the pattern to the video capture circuit via the television encoder;

c) generating, by the video capture circuit, a capture pattern based on the encoded representation of the pattern;

d) providing the capture pattern to the memory, wherein the memory stores the capture pattern in a second section to produce a stored capture pattern;

e) comparing the stored capture pattern with the pattern; and f) when the comparing of step (e) is favorable, determining that the video capture circuit, the television encoder, and a connecting path between the video capture circuit and the television encoder have passed testing.

2. The method of claim 1 further comprises, prior to step (a), writing, by the video graphics circuit, the pattern to the memory.

3. The method of claim 1 further comprises:

providing a video test source to a television tuner of the multi media subsystem;

converting, by the television tuner, the video test source into a base video signal;

providing, by the television tuner, the base video signal to the video capture circuit;

generating, by the video capture circuit, a digital representation of the base video signal;

storing the digital representation of the base video signal in the memory to produce a stored digital representation;

converting the stored digital representation into a simulated test pattern display;

comparing the simulated test pattern display with a representation of the video test source; and when the comparing of the simulated test pattern is favorable, determining that the television tuner has passed testing.

4. The method of claim 3 further comprises, when the comparing of step (d) or the comparing of the simulated test pattern is unfavorable, determining that at last one of the video capture circuit, the television encoder, the television tuner, and the connecting path between the video capture circuit and the television encoder has failed testing.

5. The method of claim 1 further comprises, prior to step (a), testing interoperability of the video graphics circuit and the memory.

6. The method of claim 1 further comprises, when the comparing of step (d) is unfavorable, determining that at last one of the video capture circuit, the television encoder, and connecting path between the video capture circuit and the television encoder has failed testing.

7. The method of claim 6 further comprises, when comparing of step (d) is unfavorable, determining that the television encoder or the connecting path has failed the testing based on output of the television encoder.

8. The method of claim 1 further comprises:

comparing captured RGB information with information stored in memory, wherein the captured RGB information was produced by an RGB capture circuit.

9. A method for testing a multi media subsystem, wherein the multi media subsystem includes an video capture circuit, a video graphics circuit, a television tuner, and a television encoder, the method comprising the steps of:

a) providing a video test source to the television tuner;

b) converting, by the television tuner, the video test source into a base video signal;

c) providing, by the television tuner, the base video signal to the video capture circuit;

d) generating, by the video capture circuit, a digital representation of the base video signal;

e) storing the digital representation of the base video signal in memory to produce a stored digital representation;

f) converting the stored digital representation into a simulated test pattern display;

g) comparing the simulated test pattern display with a representation of the video test source; and h) when the comparing is favorable, determining that the television tuner, the video capture circuit, and interconnecting paths between the television tuner and the video capture circuit have passed testing.

10. The method of claim 9 further comprises, within step (a), providing the video test source as a plurality of video test patterns.

11. The method of claim 10 further comprises, within steps (f) and (g), determining size and location of video capture screen for one of the plurality of video test patterns;

calculating pixel information for each pixel location of the video capture screen to produce calculated pixel information;

comparing the calculated pixel information with expected pixel information; and when the calculated pixel information compares favorably with the expected pixel information, determining that the television tuner, the video capture circuit, and interconnecting paths between the television tuner and the video capture circuit have passed testing.

12. The method of claim 11 further comprises:

determining size and location of video capture screen for another of the plurality of video test patterns;

calculating pixel information for each pixel location of the video capture screen for the another of the plurality of video test patterns to produce calculated pixel information;

comparing the calculated pixel information with expected pixel information; and when the calculated pixel information compares favorably with the expected pixel information, determining that the television tuner, the video capture circuit, and interconnecting paths between the television tuner and the video capture circuit have passed testing.

13. The method of claim 11 further comprises calculating the pixel information to include luminance, chrominance, and phase angle values for each pixel.

14. The method of claim 10 further comprises converting YUV information of the pixel information into RGB information;

determining whether the RGB information is below a threshold; and when the RGB information is below the threshold, determining that color aspects of the pixel information are acceptable.

15. The method of claim 10 further comprises:

providing an audio range signal to an audio input of the multi media subsystem;

performing a spectral analysis on the audio range signal; and when spectral content of the audio range signal exceeds a threshold at a harmonic of the audio range signal, determining that the multi media subsystem failed audio testing.

16. The method of claim 15 further comprises determining that a fundamental harmonic of the audio range signal is within acceptable limits.

17. A self testing multi media subsystem comprising:

memory that has a first section and a second section;

a video graphics circuit that retrieves a pattern from a first section of memory;

a television encoder operably coupled to the video graphics circuit, wherein the television encoder provides the pattern to at least one video output;

a video capture circuit operably coupled, during testing, to the at least one video output, wherein the video capture circuit generates a capture pattern based on the pattern and provides the capture pattern to the second section of the memory to produce stored capture pattern; and first means for comparing the stored capture pattern with the pattern and, when the comparison is favorable, determining that the video capture circuit, the television encoder, and the at least one video output have passed testing.

18. The self testing multi media subsystem of claim 17 further comprises:

a television tuner operably coupled to the video capture circuit, wherein the television tuner generates a base video signal from a video test source and provides the base video signal to the video capture circuit, and wherein the video capture board generates a digital representation of the base video signal, and stores the digital representation in memory to produce a stored digital representation.

19. The self testing multi media subsystem of claim 18 further comprises second means for generating a simulated test pattern display from the stored digital representation; comparing the simulated test pattern display with a representation of the video test source; and when the comparing is favorable, determining that the television tuner has passed testing.

20. The self testing multi media subsystem of claim 19 further comprises the first means providing the function of, when the comparing is unfavorable, determining that at last one of the video capture circuit, the television encoder, and connecting path between the video capture circuit and the television encoder has failed testing.

21. A self testing multi media subsystem comprising:

a television tuner that is operably coupled to receive a video test source and to produce, therefrom, a base video signal;

a video capture circuit that is operably coupled to receive the base video signal and to produce, therefrom, a digital representation of the base video signal;

memory that stores the digital representation of the base video signal as stored digital representation;

first means for converting the stored digital representation into a simulated test pattern display; comparing the simulated test pattern display with a representation of the video test source; and, when the comparing is favorable, determining that the television tuner, the video capture circuit, and interconnecting paths between the television tuner and the video capture circuit have passed testing.

22. The self testing multi media subsystem of claim 21 further comprises the television tuner operably coupled to receive the video test source as a plurality of video test patterns.

23. The self testing multi media subsystem of claim 22 further comprises the first means performing the functions of: determining size and location of video capture screen for one of the plurality of video test patterns; calculating pixel information for each pixel location of the video capture screen to produce calculated pixel information; comparing the calculated pixel information with expected pixel information; and when the calculated pixel information compares favorably with the expected pixel information, determining that the television tuner, the video capture circuit, and interconnecting paths between the television tuner and the video capture circuit have passed testing.

24. The self testing multi media subsystem of claim 23 further comprises the first means providing the functions of: determining size and location of video capture screen for another of the plurality of video test patterns; calculating pixel information for each pixel location of the video capture screen for the another of the plurality of video test patterns to produce calculated pixel information; comparing the calculated pixel information with expected pixel information; and, when the calculated pixel information compares favorably with the expected pixel information, determining that the television tuner, the video capture circuit, and interconnecting paths between the television tuner and the video capture circuit have passed testing.

25. The self testing multi media subsystem of claim 21 further comprises:
   an audio input that is operably coupled to receive an audio range signal; and
   second means for performing a spectral analysis on the audio range signal; and, when spectral content of the audio range signal exceeds a threshold at a harmonic of the audio range signal, determining that the multi media subsystem failed audio testing.

* * * * *